United States Patent
Satou

(10) Patent No.: US 8,244,131 B2
(45) Date of Patent: Aug. 14, 2012

(54) OPTICAL WAVELENGTH MULTIPLEXING DEVICE, OPTICAL WAVELENGTH DIVIDING DEVICE, OPTICAL WAVELENGTH DIVIDING MULTIPLEXING DEVICE, AND METHOD OF CONTROLLING OPTICAL BAND-PASS FILTER

(75) Inventor: Yoshirou Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 651 days.

(21) Appl. No.: 12/395,960

(22) Filed: Mar. 2, 2009

(65) Prior Publication Data

US 2009/0220237 A1 Sep. 3, 2009

(30) Foreign Application Priority Data

Mar. 3, 2008 (JP) ................................. 2008-052049

(51) Int. Cl.
H04J 14/02 (2006.01)
(52) U.S. Cl. .......................................... 398/79; 398/85
(58) Field of Classification Search .................... 398/79, 398/82, 83, 85
See application file for complete search history.

(56) References Cited

FOREIGN PATENT DOCUMENTS

| JP | 1991233425 A | 10/1991 |
|---|---|---|
| JP | 11346191 A2 | 12/1999 |
| JP | 11355216 A2 | 12/1999 |
| JP | 2001268055 A2 | 9/2001 |
| WO | 0211337 A | 2/2002 |

OTHER PUBLICATIONS

Office action issued in counterpart JP patent application, 2008-052049, by Japanese Patent Office, dated Jun. 15, 2012.
K. Yu et al., "Tunable optical bandpass filter with variable-aperture MEMS reflector," Journal of Lightwave Technology, vol. 24, No. 12, Dec. 2006.

*Primary Examiner* — Jack Dinh

(57) ABSTRACT

To equip an optical wavelength dividing multiplexing system with a variable optical band-pass filter, and to provide an apparatus to change the center wavelength and the band width of an optical-band pass filter according to an optical wavelength band to be transmitted, and a method of controlling the apparatus. An optical wavelength multiplexing device 100 includes a CPL (multiplexing portion) 3 that multiplexes optical signals and outputs the multiplexed signal, a BPF (optical band-pass filter) 9 that is capable of changing its center wavelength and band width and receives an optical multiplex signal output by the multiplexing portion and lets the received optical multiplex signal pass therethrough, a storage portion that stores wavelength band control information 4 specifying the center wavelength and the band width, and a control portion that controls the center wavelength and the band width of the BPF 9 based on the wavelength band control information 4. The control circuit 10 controls the center wavelength and the band width of the BPF 9 based on the wavelength band control information 4.

19 Claims, 6 Drawing Sheets

OPTICAL WAVELENGTH MULTIPLEXING DEVICE, OPTICAL WAVELENGTH DIVIDING DEVICE, OPTICAL WAVELENGTH DIVIDING MULTIPLEXING DEVICE, AND METHOD OF CONTROLLING OPTICAL BAND-PASS FILTER

INCORPORATION BY REFERENCE

This application is based upon and claims the benefit of priority from Japanese patent application No. 2008-052049, filed on Mar. 3, 2008, the disclosure of which is incorporated herein in its entirety by reference.

BACKGROUND OF THE INVENTION

1. Technical Field

The present invention relates to an apparatus equipped with an optical band filter capable of changing its center wavelength and band width, and a method of controlling the same.

2. Background Art

A technique in which additional optical wavelength multiplexers and optical wavelength dividers are successively installed so as to cope with the communication demand while maintaining the communication state is disclosed in International Republication No. WO02/011337. This technique is composed of a master rack and slave racks. A certain number of optical wavelength signals are processed and managed by the master rack in the early operation, and then additional slave racks are installed one after another by coupling them to the master rack so as to cope with the increasing demand for the wavelength signals.

A related optical wavelength dividing multiplexing device is explained hereinafter with reference to FIGS. 5 and 6. FIG. 5 shows an optical wavelength multiplexing device, and FIG. 6 shows an optical wavelength dividing device. In the optical wavelength multiplexing device in FIG. 5, optical signals having different wavelengths output from OS1s p-1-p-k are individually compensated for their dispersion by DCMs 2p-1-2p-k, and become an optical wavelength multiplex signal of λ1-λk at a CPL 3p. The optical wavelength multiplex signal λ1-λk is collectively compensated for dispersion by a DCM 5p and amplified by an AMP 6p to compensate for the insertion loss of the DCMs 2p-1-2p-k, the CPL3p, and the DCM 5p. The optical wavelength multiplex signal λ1-λk output from the AMP 6p is input to an optical band-pass filter 20 having a predetermined fixed center wavelength and band width.

Meanwhile, in the optical wavelength dividing device shown in FIG. 6, an optical wavelength multiplex signal λ1-λk is input to a BPF 21p. The optical wavelength multiplex signal λ1-λk output from the BPF 21p is collectively compensated for dispersion by a DCM 13p and amplified by an AMP 14p to compensate for the insertion loss of the DCM 13p. The optical wavelength multiplex signal λ1-λk output from the AMP 14p is divided in accordance with the wavelength by an SPL 15p, compensated individually for dispersion by DCMs 17p-1-17-k, and received by ORs 18p-1-18p-k.

However, the optical band-pass filter of the block wavelength band has a fixed center wavelength and band width. Therefore, it has been impossible to change the combination of a center wavelength, a band width, and a number of divisions even when there is a more optimal combination of them in the block wavelength band depending on the transmission distance and the transmission fiber characteristics of a transmission system. A technique in which a signal laser is generated by a light-emitting diode by extracting a certain wavelength from the output of the light-emitting diode with a filter is disclosed in Japanese Unexamined Patent Application Publication No. 03-233425. However, it is not the one to which a technique to change the center wavelength and the band width of an optical band-pass filter according to an optical wavelength band to be transmitted within an optical wavelength multiplexing device or an optical wavelength dividing device can be applied.

Furthermore, in a case where an additional block wavelength band is provided, if the device receives an input from an optical wavelength multiplexing portion of another device that does not conform to the device specifications in terms of wavelength, optical power level, or the like, that input could have an adverse effect on the entire transmission system. Because any signal within the wavelength band can pass through it without blocking an improper signal. Furthermore, since an improper connection also has not been notified, the detection of the occurrence of malfunction has been often delayed, and a lot of time has been required to find out the cause of the malfunction.

An exemplary object of the present invention is provided an apparatus and a method of controlling the apparatus to equip an optical wavelength dividing multiplexing device with a variable optical band-pass filter, and to change the center wavelength and the band width of an optical-band pass filter according to an optical wavelength band to be transmitted.

SUMMARY

In accordance with an exemplary aspect of the invention, an optical wavelength multiplexing device includes: a multiplexing portion that outputs an optical multiplex signal by multiplexing optical signals; an optical band-pass filter that receives an optical multiplex signal output by the multiplexing portion and lets the received optical multiplex signal pass therethrough, the optical band-pass filter being capable of changing its center wavelength and band width; a storage portion that stores wavelength band control information specifying the center wavelength and the band width; and a control portion that controls the center wavelength and the band width of the optical band-pass filter based on the wavelength band control information.

Furthermore, in accordance with another exemplary aspect of the invention, an optical wavelength dividing device includes: an optical band-pass filter capable of changing its center wavelength and band width; a storage portion that stores wavelength band control information specifying the center wavelength and the band width; and a control portion that controls the center wavelength and the band width of the optical band-pass filter based on the wavelength band control information; and a dividing portion that receives an optical signal output from the optical band-pass filter.

Furthermore, in accordance with another exemplary aspect of the invention, an optical wavelength dividing multiplexing device includes the above-described optical wavelength multiplexing device and the above-described optical wavelength dividing device.

In accordance with another exemplary aspect of the invention, a method of controlling an optical band-pass filter that is installed in at least one of an optical wavelength multiplexing device and an optical wavelength dividing device includes: determining wavelength band control information specifying the center wavelength and the band width of the optical band-pass filter capable of changing the center wavelength and the band width; and controlling the center wavelength and the band width of the optical band-pass filter based on the wavelength band control information.

The above and other objects, features and advantages of the present invention will become more fully understood from the detailed description given hereinbelow and the accompanying drawings which are given by way of illustration only, and thus are not to be considered as limiting the present invention.

EXEMPLARY EMBODIMENT

Exemplary embodiments of the present invention are explained hereinafter with reference to the drawings. To clarify the explanation, omissions and simplifications are made as appropriate in the following description and the drawings. The same signs are assigned to components and equivalent portions having identical structures or functions throughout the drawings, and explanation of them are omitted as appropriate.

Figure 1:
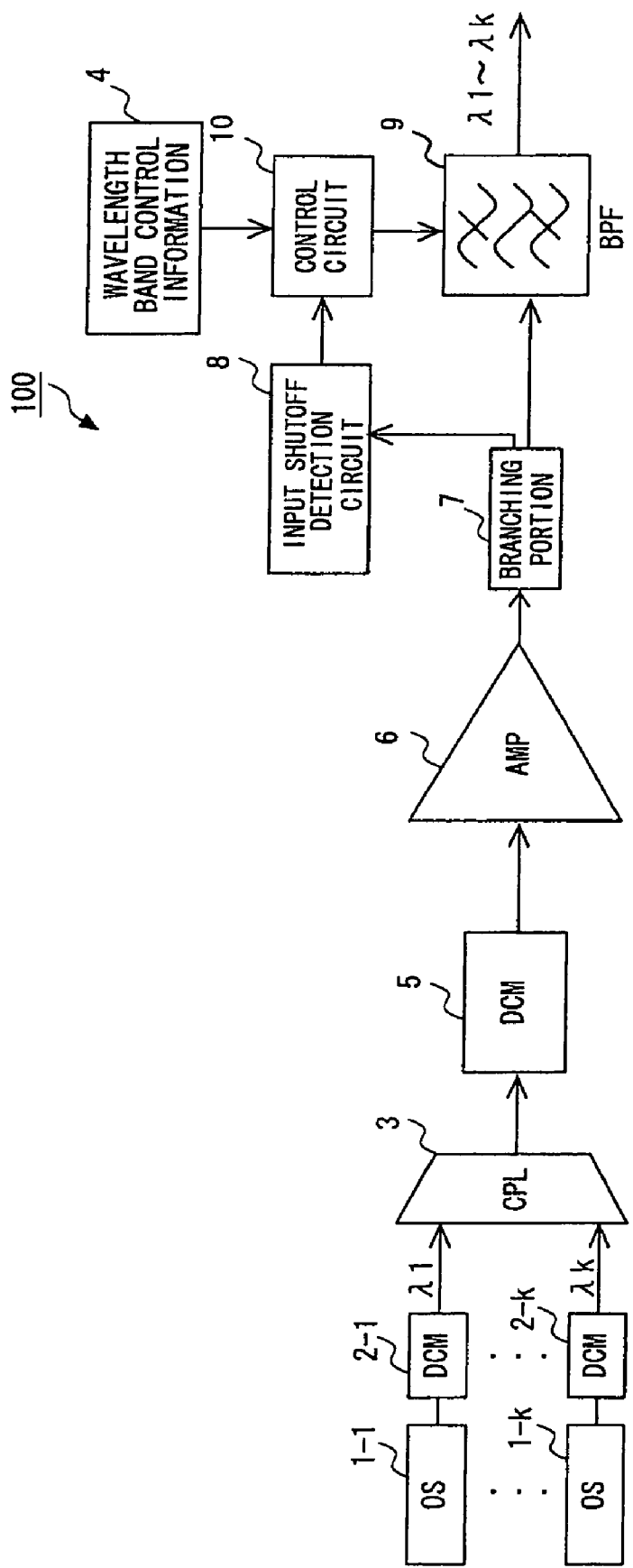
FIG. 1 is a block diagram illustrating a configuration example of an optical wavelength multiplexing device in accordance with a first exemplary embodiment of the present invention.

Furthermore, there are pluralities of identical components in the specification, therefore a sign "-n" (n is an integer greater than 0) is added to each of those identical components in order to differentiate one from another. For example, FIG. 1 shows that there are a plurality of OSs 1-1, 1-2, . . . 1-$k$. For example, when explanation is made with reference to FIG. 1, the term "OS 1" represents any one or several OSs 1 among a plurality of OSs 1, i.e., OS 1-1-OS 1-$k$, and the term "OS 1-1" (or "OS 1-2" or the like) is used to differentiate one from another among the plurality of OSs 1.

In each exemplary embodiment of optical wavelength dividing multiplexing devices in accordance one aspect of the present invention, an optical wavelength multiplexing device and an optical wavelength dividing device that are applied to a case where each of the transmitting side and the receiving side is composed of a device of one or a plurality of block wavelength bands are explained. The term "block wavelength band" means to divide a wavelength range, in which optical signals are transmitted, into several blocks.

First Exemplary Embodiment

FIG. 1 is a block diagram illustrating a configuration example of an optical wavelength multiplexing device in accordance with a first exemplary embodiment of the present invention. An optical wavelength multiplexing device 100 includes signal transmitters (OSs) 1-1-1-$k$, dispersion compensators (DCMs) 2-1-2-$k$, a multiplexing portion (optical wavelength multiplexing portion, CPL) 3, wavelength band control information 4, a DCM 5, an optical amplifier (AMP) 6, a branching portion 7, an input shutoff detection circuit (input shutoff detection portion) 8, an optical band-pass filter (BPF) 9, and a control circuit (control portion) 10. The optical wavelength multiplexing device 100 includes k OSs 1 and k DCMs 2 in FIG. 1, and it shows a configuration example of a device to multiplex k different optical signals. Note that if the optical wavelength multiplexing device 100 shown in FIG. 1 is composed of a device of a plurality of block wavelength bands, it can be also considered as a configuration example of a device to multiplex optical signals for each of the transmitting-side block wavelength bands.

Each of the OSs 1-1-1-$k$ outputs one of k optical signals having different wavelengths $\lambda 1$-$\lambda k$. The DCMs 2-1-2-$k$ partially compensate the optical signals of wavelengths $\lambda 1$-$\lambda k$ having different wavelength dispersion for their dispersion in an individual manner. The multiplexing portion 3 is an optical wave combiner to wavelength-multiplex the optical signals of wavelengths $\lambda 1$-$\lambda k$. The DCM 5 partially compensates the optical signal of wavelengths $\lambda 1$-$\lambda k$ having different wavelength dispersion for dispersion in a collective manner. The AMP 6 amplifies the optical signal in the signal band of wavelengths $\lambda 1$-$\lambda n$.

The wavelength band control information 4 is information to control the center wavelength and the band width of the band-pass filter 9. The wavelength band control information 4 is stored in a storage area (storage portion) within the device. The storage area may be located within the control circuit 10, or in a different area within the optical wavelength multiplexing device 100. The wavelength band control information 4 is determined based on the multiplexing portion 3 (e.g., based on the type of the installed multiplexing portion 3), and specifies the center wavelength and the band width. That is, the center wavelength and the band width of the BPF 9 is determined based on information specified by the wavelength band control information 4. Therefore, the band width of an optical signal output from the optical wavelength multiplexing device is determined according to the wavelength band control information 4.

The branching portion 7 is an optical branching device to branch the optical power output from the AMP 6 to the band-pass filter 9 and to the input shutoff detection circuit 8. The input shutoff detection circuit 8 monitors the presence or absence of the output from the AMP 6. The band-pass filter 9 is a tunable optical band-pass filter capable of arbitrarily selecting its center wavelength and band width. The band-pass filter 9 has a mode where a gate through which an optical signal (optical multiplex signal) passes is opened, and a mode where the gate by which an optical signal is blocked is closed. Furthermore, the opening and closing of the gate is controlled by the control circuit 10. The control circuit 10 controls the band-pass filter 9 by using information from the wavelength band control information 4 (set values for the center wavelength and the band width of the BPF 9) and information from the input shutoff detection circuit 8 (presence or absence of the output from the AMP 6).

The band-pass filter 9 of the optical wavelength multiplexing device 100 in FIG. 1 is controlled and operated in the following manner. The control circuit 10 acquires information about the center wavelength and the band width to control the BPF 9 by the wavelength band control information 4 that is generated based on the multiplexing portion 3. Furthermore, the control circuit 10 also acquires information about the presence or absence of an optical signal in front of the input shutoff detection circuit 8. When the control circuit 10 recognizes the wavelength band control information 4 and the presence of the optical signal, the BPF 9 changes its center wavelength and band width from the default values that are defined outside of the signal band to the center wavelength and the band width set in the wavelength band control information 4. Then, the BPF 9 opens the gate to let the optical multiplex signal pass therethrough. In this way, the BPF 9 lets optical multiplex signals having center wavelengths and band widths within the established ranges pass therethrough.

Figure 2:
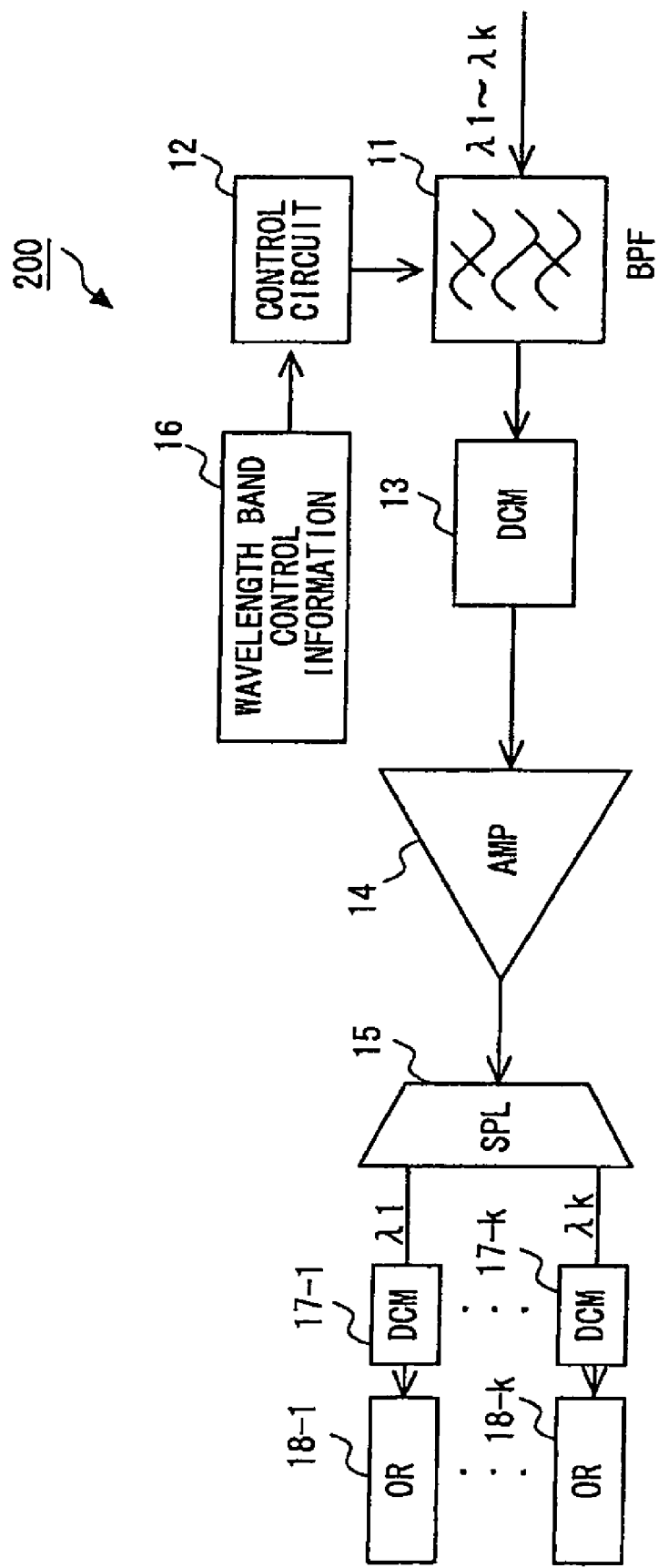
FIG. 2 is a block diagram illustrating a configuration example of an optical wavelength dividing device in accordance with a first exemplary embodiment of the present invention.

FIG. 2 is a block diagram illustrating a configuration example of an optical wavelength dividing device in accordance with a first exemplary embodiment of the present invention. An optical wavelength dividing device 200 includes a BPF 11, a control circuit (control portion) 12, a DCM 13, an AMP 14, a dividing portion (optical wavelength dividing portion, SPL) 15, wavelength band control information 16, DCMs 17-1-17-$k$, and ORs 18-1-18-$k$. The optical wavelength dividing device 200 includes k ORs 18 and k DCMs 17 in FIG. 2, and it shows a configuration example of a device to divide an input optical signal into k different optical signals. Note that if the optical wavelength dividing device 200 shown in FIG. 2 is composed of a device of a plurality of block wavelength bands, it can be also considered as a configuration example of a device to divide an optical signal for each of the receiving-side block wavelength bands.

In the specification, components that are referred by the same names in both of the optical wavelength multiplexing device 100 and in the optical wavelength dividing device 200 are sometimes differentiated from ones from the others by calling the components installed in the optical wavelength multiplexing device 100 and components installed in the optical wavelength dividing device 200 as "transmitting side" and "receiving side" respectively. For example, the control circuit is sometimes referred to as "transmitting-side control circuit 10" or "receiving-side control circuit 12" to differentiate one from the other.

The BPF 11 is a tunable optical band-pass filter capable of arbitrarily selecting its center wavelength and band width. Its gate is operated in a similar manner to that of the BPF 9. The DCM 13 partially compensates an optical signal of wavelengths $\lambda 1$-$\lambda k$ having different wavelength dispersion for dispersion in a collective manner. The AMP 14 amplifies an optical signal in the signal band of wavelengths $\lambda 1$-$\lambda n$. The dividing portion 15 wavelength-divides an optical signal of wavelengths $\lambda 1$-$\lambda k$. The DCMs 17-1-17-$k$ are dispersion compensators to partially compensate the optical signals of wavelengths $\lambda 1$-$\lambda k$ having different wavelength dispersion for dispersion in an individual manner. The ORs 18-1-18-$k$ are k signal receivers to receive k optical signals having different wavelengths $\lambda 1$-$\lambda k$.

The wavelength band control information 16 is information to control the center wavelength and the band width of the BPF 11. Similarly to the wavelength band control information 4, it is stored in a storage area. Furthermore, the wavelength band control information 16 is generated based on the dividing portion 15 (e.g., based on the type of the installed dividing portion 15), and specifies the center wavelength and the bandwidth. That is, the center wavelength and the band width of the BPF 11 is determined based on information specified by the wavelength band control information 16. Therefore, the band width of a multiplexed optical signal that is received by the optical wavelength dividing device from an optical wavelength multiplexing device is determined according to the wavelength band control information 16.

The control circuit 12 controls the BPF 11 by using information from the wavelength band control information 16 (set values for the center wavelength and the band width of the BPF 11).

The BPF 11 of the optical wavelength dividing device 200 in FIG. 2 is controlled and operated in the following manner. The control circuit 12 acquires information about the center wavelength and the band width from the wavelength band control information 16 possessed by the dividing portion 15 in order to control the BPF 11. When the control circuit 12 recognizes the wavelength band control information 16, the BPF 11 changes its center wavelength and band width from the default values that are defined outside of the signal band to the center wavelength and the band width set in the wavelength band control information 16. Then, the BPF 11 opens the gate to let an optical multiplex signal pass therethrough. In this way, the BPF 11 lets optical multiplex signals having center wavelengths and band widths within the established ranges pass therethrough.

In this manner, by automatically changing the center wavelengths and the band widths of the tunable optical band-pass filters that are adopted as the BPFs 9 and 11 by the wavelength band control information 4 and 16, various variations of block wavelength bands can be designed in the exemplary embodiment of the present invention. Furthermore, when uncertain one having no wavelength band control information or one having incorrect control information is connected, the gate that would otherwise let an optical multiplex signal pass through the filter is closed (i.e., the tunable optical band-pass filter remains in the range outside of the signal band). Therefore, it is possible to prevent an improper signal input due to the incorrect connection. Note that the overall operation of the optical wavelength multiplexing device 100 and the optical wavelength dividing device 200 are explained in detail with a second exemplary embodiment.

In this manner, an optical wavelength dividing multiplexing device can be equipped with a variable optical band-pass filter, and an apparatus to change the center wavelength and the band width of the optical-band pass filter according to an optical wavelength band to be transmitted and a method of controlling the apparatus can be provided in accordance with the exemplary embodiment of the present invention.

Second Exemplary Embodiment

Configuration examples of an optical wavelength multiplexing device and an optical wavelength dividing device in accordance with one aspect of the present invention are explained in the first exemplary embodiment. In a second exemplary embodiment, a configuration example where a plurality of optical wavelength multiplexing devices and optical wavelength dividing devices are provided and each device multiplexes or divides an optical wavelength in a corresponding block wavelength band is explained.

Figure 3:
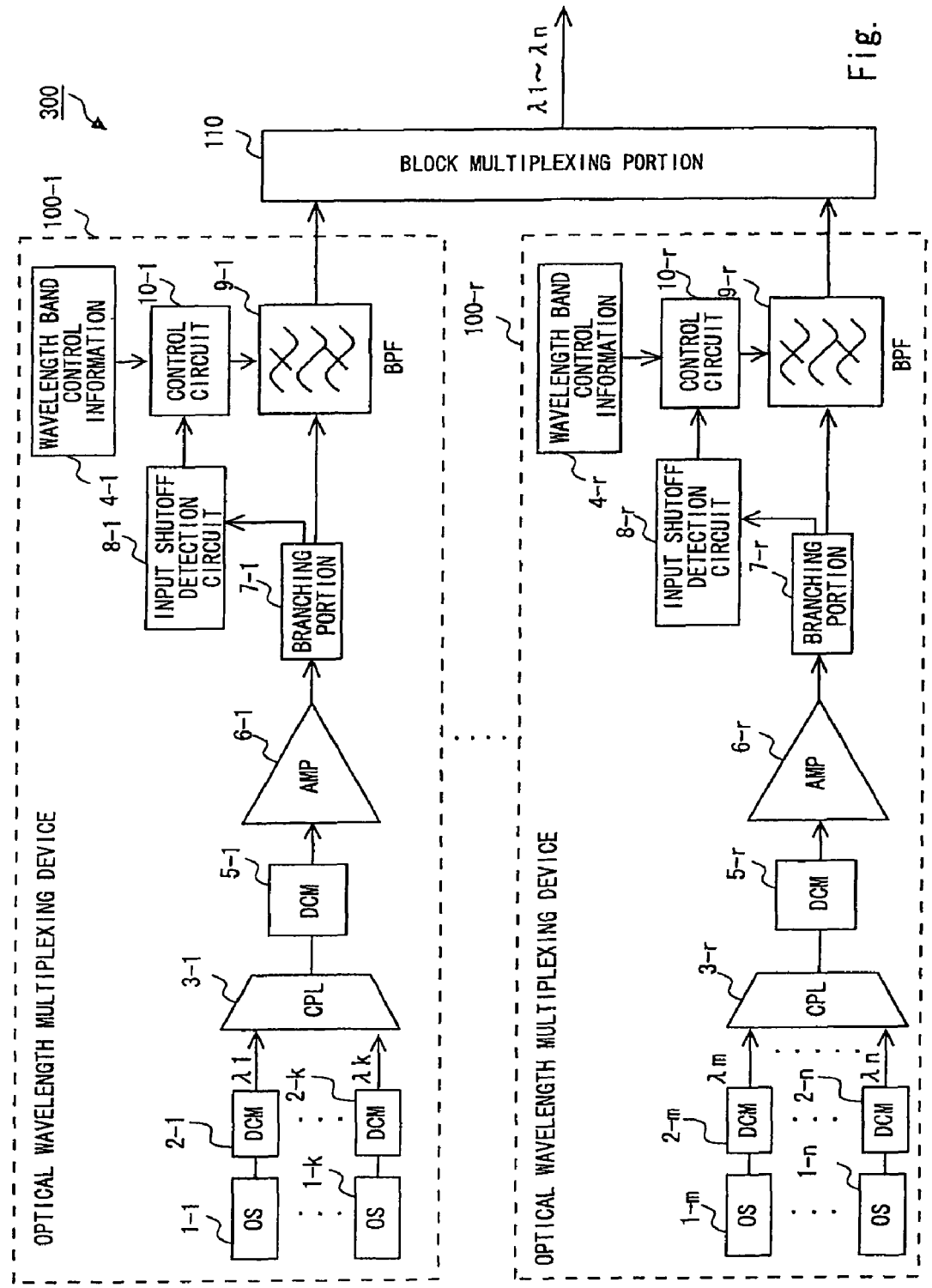
FIG. 3 is a block diagram illustrating a configuration example of an optical wavelength multiplexing device that converts optical signals into optical multiplex signals of a plurality of different transmitting-side block wavelength bands by multiplexing the optical signals, and outputs an optical wavelength multiplex signal generated by further multiplexing the multiplexed optical multiplex signals of the plurality of transmitting-side block wavelength bands.

FIG. 3 is a block diagram illustrating a configuration example of an optical wavelength multiplexing device that converts optical signals into optical multiplex signals of a plurality of different transmitting-side block wavelength bands 1-$r$ by multiplexing the optical signals, and outputs an optical wavelength multiplex signal generated by further multiplexing the multiplexed optical multiplex signals of the plurality of transmitting-side block wavelength bands 1-$r$. Furthermore, FIG. 4 is a block diagram illustrating a configuration example of an optical wavelength dividing device that divides an optical wavelength multiplex signal into a plurality of optical multiplex signals of different block wavelength bands, and further divides the optical multiplex signals of the block wavelength bands.

An optical wavelength multiplexing device 300 shown in FIG. 3 includes a plurality of optical wavelength multiplexing devices 100-1-100-$r$, and a block multiplexing portion 110. Each of the optical wavelength multiplexing devices 100-1-100-$r$ outputs an optical multiplex signal of a different transmitting-side block wavelength band. The optical wavelength multiplexing devices 100-1-100-$r$, each of which multiplexes optical signals $\lambda 1$-$\lambda n$ for a corresponding block, output optical signals divided into r signals as a whole. Each of the optical wavelength multiplexing devices 100-1-100-$r$ has an identical structure with the optical wavelength multiplexing device 100 shown in FIG. 1, and therefore its explanation is omitted. Each of the optical wavelength multiplexing devices 100-1-100-$r$ is also referred to as "block wavelength band multiplexing portion" to differentiate it from the optical wavelength multiplexing device 300.

The block multiplexing portion 110 is an optical wave combiner to wavelength-multiplex optical multiplex signals, each of which is wave-combined in corresponding one of the plurality of the wavelength bands, i.e., transmitting-side block wavelength bands 1-$r$, into an optical multiplex signal $\lambda 1$-$\lambda n$.

Figure 4:
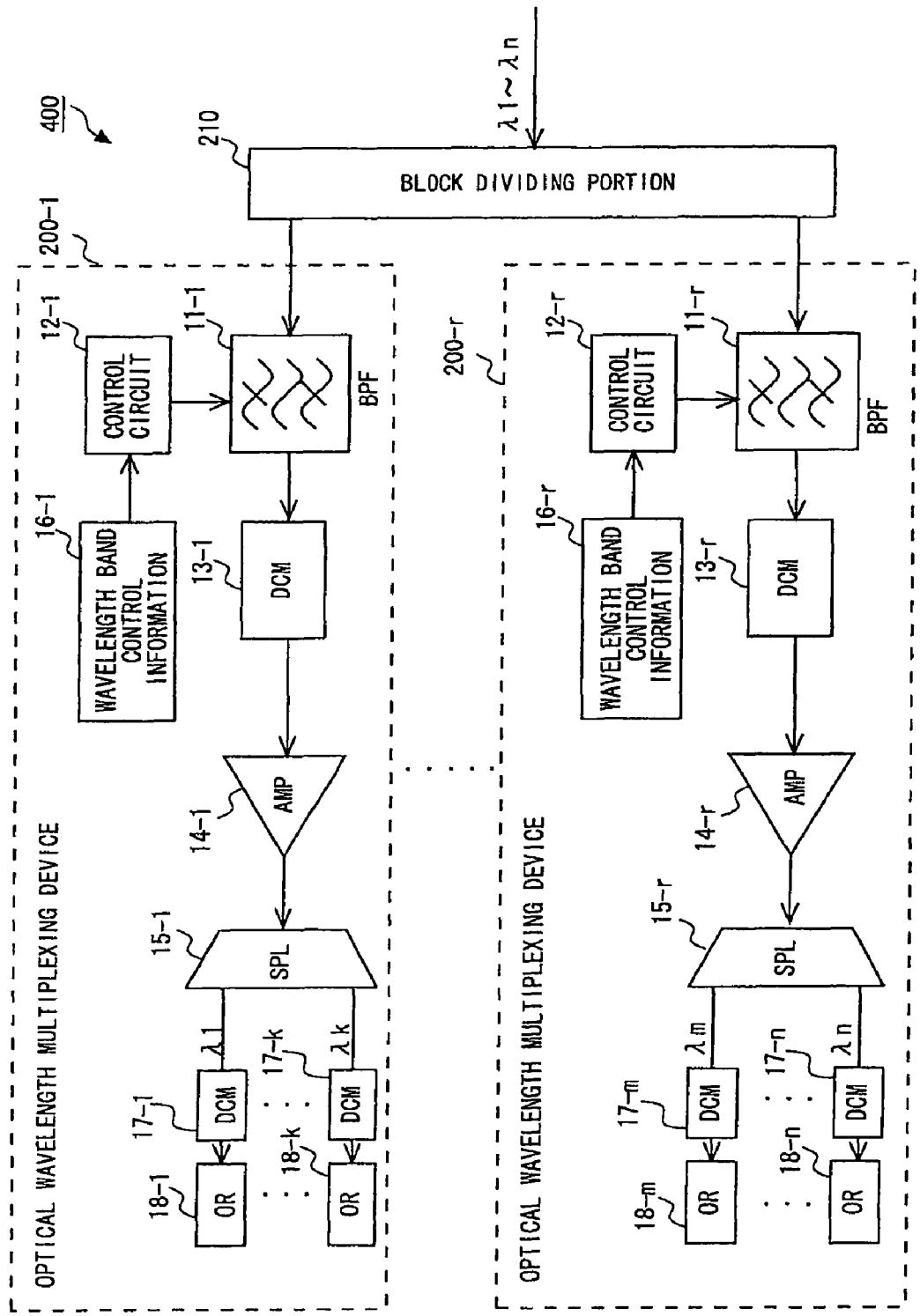
FIG. 4 is a block diagram illustrating a configuration example of an optical wavelength dividing device that divides an optical wavelength multiplex signal into a plurality of optical multiplex signals of different block wavelength bands, and further divides the optical multiplex signals of the block wavelength bands.
Figure 5:
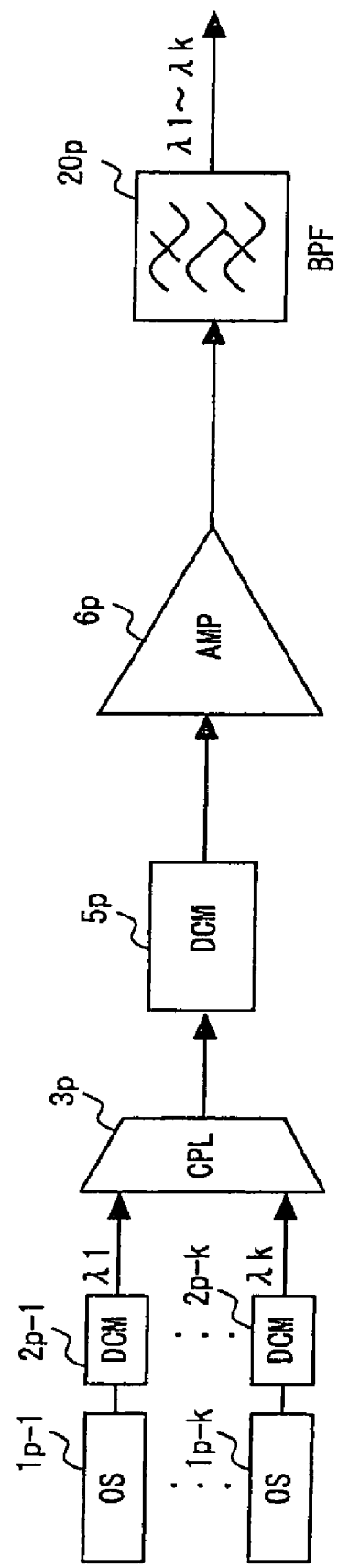
FIG. 5 is a block diagram illustrating a related optical wavelength multiplexing device.
Figure 6:
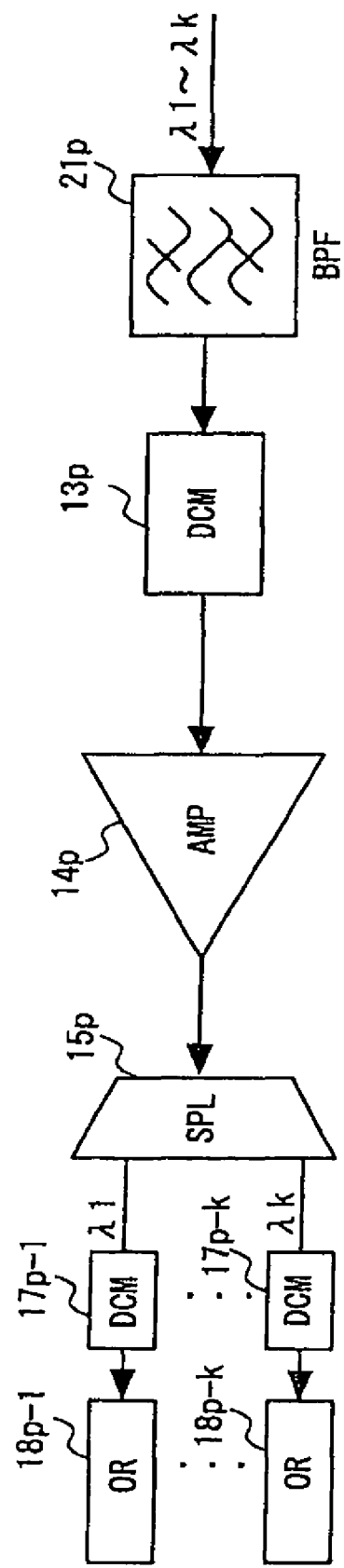
FIG. 6 is a block diagram illustrating a related optical wavelength dividing device.

An optical wavelength diving device 400 shown in FIG. 4 includes a plurality of optical wavelength dividing devices 200-1-200-$r$, and a block dividing portion 210. Each of the optical wavelength dividing devices 200-1-200-$r$ divides an optical multiplex signal of one of r different receiving-side block wavelength bands 1-$r$. Each of the optical wavelength dividing devices 200-1-200-$r$ has an identical structure with the optical wavelength dividing device 200 shown in FIG. 2, and therefore its explanation is omitted. Each of the optical wavelength dividing devices 200-1-200-$r$ is also referred to as "block wavelength band dividing portion" to differentiate it from the optical wavelength diving device 400.

The block dividing portion 210 is an optical branching device to branch the optical power of an optical multiplex signal $\lambda 1$-$\lambda n$ input from the optical wavelength multiplexing device 300 into a plurality of pieces. In this example, the optical power of the optical multiplex signal $\lambda 1$-$\lambda n$ is divided such that each divided portion is output to corresponding one of the r optical wavelength dividing devices 200-1-200-$r$. In this example, it is branched into the receiving-side block wavelength bands 1-$r$.

Next, the operation of this exemplary embodiment of the present invention is explained hereinafter with reference to FIGS. 3 and 4. In the optical wavelength multiplexing device 100-1 in FIG. 3, optical signals having different wavelengths output from the OSs 1-1-1-$k$ are individually compensated for their dispersion by the DCMs 2-1-2-$k$, and become an optical wavelength multiplex signal of $\lambda 1$-$\lambda k$ at the multiplexing portion 3-1. The optical wavelength multiplex signal $\lambda 1$-$\lambda k$ is collectively compensated for dispersion by the DCM 5-1, and amplified by AMP 6-1 to compensate for the insertion loss of the DCMs 2-1-2-$k$, the multiplexing portion 3-1, and the DCM 5-1. The optical wavelength multiplex signal $\lambda 1$-$\lambda k$ output from the AMP 6-1 is branched into two pieces, i.e., to a primary path to the BPF 9-1 and to a secondary path to the input shutoff detection circuit 8-1 by the branching portion 7-1 in order to monitor the presence or absence of its output.

At this point, if the wavelength band control information 4-1 has a correctly-defined value and the input shutoff detection circuit 8-1 determines that input shutoff is not detected, the control circuit 10-1 instructs the BPF 9-1 to open its gate. The BPF 9-1 changes its center wavelength and band width from the default values that are defined outside of the signal band to the center wavelength and the band width set in the wavelength band control information 4-1. Then, it opens the gate to let the optical wavelength multiplex signal pass though. In this way, the BPF 9-1 outputs the optical multiplex signal of the transmitting-side block wavelength band 1 to the block multiplexing portion 110.

Furthermore, when a problem is detected at least one of the value of the wavelength band control information 4-1 and the detection of input shutoff, the control circuit 10-1 makes the BPF 9-1 close its gate and notifies the abnormal state. Specifically, when the control circuit 10-1 determines that the wavelength band control information 4-1 has a correctly-defined value and that input shutoff is detected, it makes the BPF 9-1 close the gate to block the signal and notifies the input shutoff. When the control circuit 10-1 determines that the wavelength band control information 4-1 has an uncertain value and that input shutoff is not detected, it makes the BPF 9-1 close the gate to block the signal and notifies the incorrect connection. When the control circuit 10-1 determines that the wavelength band control information 4-1 has an uncertain value and that input shutoff is detected, it makes the BPF 9-1 close the gate to block the signal and notifies the input shutoff. The case of the optical wavelength multiplexing device 100-1 is explained in the above description, and since the remaining optical wavelength multiplexing devices 100-2-100-$r$ are similar to the optical wavelength multiplexing device 100-1, their explanation is omitted.

The block multiplexing portion 110 multiplexes optical multiplex signals of the block wavelength bands 1-$r$, each of which is output from corresponding one of the optical wavelength multiplexing devices 100-1-100-$r$, and outputs an optical wavelength multiplex signal $\lambda 1$-$\lambda n$. The optical wavelength multiplex signal $\lambda 1$-$\lambda n$ is input to the block dividing portion 210 of the optical wavelength diving device 400 in FIG. 4. The block dividing portion 210 divides the optical wavelength multiplex signal $\lambda 1$-$\lambda n$ into optical multiplex signals of the receiving-side block wavelength bands 1-$r$, and outputs the optical multiplex signals to their respective optical wavelength dividing devices 200-1-200-$r$.

In the optical wavelength dividing device 200-1 in FIG. 4, the optical wavelength multiplex signal $\lambda 1$-$\lambda k$ are input to the BPF 11-1. At this point, if the wavelength band control information 16-1 has a correctly-defined value, the control circuit 12-1 instructs the BPF 11-1 to open its gate. The BPF 11-1 changes its center wavelength and band width from the default values that are defined outside of the signal band to the center wavelength and the band width set in the wavelength band control information 16-1. Then, the BPF 11-1 opens the gate to let the optical multiplex signal pass though. Meanwhile, when the control circuit 12-1 determines that the wavelength band control information 16-1 has an uncertain value, it makes the BPF 11-1 close the gate to block the signal and notifies the incorrect connection.

When the gate of the BPF 11-1 is opened, the optical wavelength multiplex signal $\lambda 1$-$\lambda k$ output from the BPF 11-1 is collectively compensated for dispersion by the DCM 13-1, and amplified by AMP 14-1 to compensate for the insertion loss of the DCM 13-1. The optical wavelength multiplex signal $\lambda 1$-$\lambda k$ output from the AMP 14-1 is divided in accordance with the wavelength by the SPL 15-1, compensated individually for dispersion by the DCMs 17-1-17-$k$, and received by the OR 18-1-OR 18-$k$. The case of the optical wavelength dividing device 200-1 is explained in the above description, and since the remaining optical wavelength multiplexing devices 200-2-200-$r$ are similar to the optical wavelength dividing device 200-1, their explanation is omitted.

In this manner, an optical wavelength dividing multiplexing device can be equipped with a variable optical band-pass filter, and an apparatus to change the center wavelength and the band width of the optical-band pass filter according to an optical wavelength band to be transmitted and a method of controlling the apparatus can be provided in accordance with this exemplary embodiment of the present invention. Furthermore, it is possible to change the number of blocks of the block wavelength bands by adjusting the center wavelength and the band width of the BPF.

As has been explained above, in an optical wavelength dividing multiplexing device in accordance with each of the exemplary embodiment of the present invention: each of the optical wavelength multiplexing side and the optical wavelength dividing side is equipped with a tunable optical band-pass filter; a more optimal combination of the center wavelength, the band width, and the number of divisions of the divided wavelength bands is achieved based on the transmission distance and the transmission fiber characteristics of the transmission system by automatically changing the center wavelength and the band width of the filter; and a function to prevent the incorrect signal connection to the optical wavelength multiplexing portion is provided. With such a device and a method of controlling the device, the following exemplary advantages are obtained.

A first exemplary advantage according to the invention is that the optical band-pass filter of an optical wavelength multiplexing device or an optical wavelength dividing device can change its center wavelength and the band width based on wavelength band control information. In this manner, when an optical wavelength dividing multiplexing device is constructed with a plurality of block wavelength bands, a more optimal combination of the center wavelength, the band width, and the number of divisions of the block wavelength band is achieved based on the transmission distance and the transmission fiber characteristics of the transmission system. Therefore, it is possible to perform designing with a high degree of flexibility in terms of the center wavelength, the band width, the number of divisions of the bock wavelength band. For example, in a case where the wavelength gradient in the transmission path dispersion is small, it is conceivable to reduce the number of divided wavelength bands by broadening each wavelength band for which dispersion is collectively compensated (i.e., by broadening the band width of the optical band-pass filter) so that the device structure becomes smaller. On the other hand, when the wavelength gradient is large, it is conceivable to increase the number of divided wavelength bands by narrowing each wavelength band for which dispersion is collectively compensated (i.e., by narrowing the band width of the optical band-pass filter) so that the amount of individual compensation for dispersion becomes smaller.

A second exemplary advantage according to the invention is that in a case where an additional block wavelength band is provided, when the device receives an input from an optical multiplex signal that does not conform to the device specifications, it is possible to detect the abnormality, and thus to block the signal and to notify the incorrect connection. Specifically, when the device receives an input from an optical wavelength multiplex signal from another device that does not conform to the device specifications in terms of wavelength, optical power level, or the like, the abnormality is detected since the wavelength band control information is uncertain. In this way, the gate of the optical band-pass filter is closed, and therefore it is possible to block the signal and to notify the incorrect connection. For example, when an incorrect wavelength multiplexing portion or wavelength dividing portion having no wavelength band control information for the optical band-pass filter is connected, it is possible to block the signal by closing the gate of the tunable optical band-pass filter and to notify the incorrect connection. In this way, it is possible to prevent an incorrect signal connection to the divided wavelength multiplexing portion.

In accordance with one aspect of the present invention, an optical wavelength dividing multiplexing device can be equipped with a variable optical band-pass filter, and an apparatus to change the center wavelength and the band width of the optical-band pass filter according to an optical wavelength band to be transmitted and a method of controlling the apparatus can be provided.

The first and second exemplary embodiments can be combined as desirable by one of ordinary skill in the art.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical wavelength multiplexing device comprising:
   a multiplexing portion that outputs an optical multiplex signal by multiplexing optical signals;
   an optical band-pass filter that receives an optical multiplex signal output by the multiplexing portion and lets the received optical multiplex signal pass therethrough, the optical band-pass filter being capable of changing a center wavelength and a band width;
   a storage portion that stores wavelength band control information specifying the center wavelength and the band width; and
   a control portion that controls the center wavelength and the band width of the optical band-pass filter based on the wavelength band control information.

2. The optical wavelength multiplexing device according to claim 1, wherein the storage portion stores wavelength band control information specifying the center wavelength and the band width based on a type of the multiplexing portion.

3. The optical wavelength multiplexing device according to claim 2, wherein the control potion detects that the wavelength band control information has an uncertain value, and makes the optical band-pass filter close a gate.

4. The optical wavelength multiplexing device according to claim 3, further comprising:
   a branching portion to branch an optical multiplex signal output from the multiplexing portion; and
   an input shutoff detection portion that receives the branched optical signal and detects input shutoff;
   wherein when at least one of a situation where the input shutoff is detected and a situation where the input shutoff is not detected and the wavelength band control information has an uncertain value occurs, the control portion closes the gate and notifies the abnormal state.

5. The optical wavelength multiplexing device according to claim 1, wherein the control potion detects that the wavelength band control information has an uncertain value, and makes the optical band-pass filter close a gate.

6. The optical wavelength multiplexing device according to claim 5, further comprising:
a branching portion to branch an optical multiplex signal output from the multiplexing portion; and
an input shutoff detection portion that receives the branched optical signal and detects input shutoff;
wherein when at least one of a situation where the input shutoff is detected and a situation where the input shutoff is not detected and the wavelength band control information has an uncertain value occurs, the control portion closes the gate and notifies the abnormal state.

7. An optical wavelength multiplexing device comprising a plurality of optical wavelength multiplexing devices according to claim 1,
wherein the optical wavelength multiplexing device further comprises a block multiplexing portion that further multiplexes a plurality of optical multiplex signals having different wavelength bands output from the plurality of optical wavelength multiplexing devices.

8. The optical wavelength multiplexing device according to claim 7, wherein the storage portion stores wavelength band control information specifying the center wavelength and the band width based on a type of the multiplexing portion.

9. The optical wavelength multiplexing device according to claim 8, wherein the control potion detects that the wavelength band control information has an uncertain value, and makes the optical band-pass filter close a gate.

10. The optical wavelength multiplexing device according to claim 9, further comprising:
a branching portion to branch an optical multiplex signal output from the multiplexing portion; and
an input shutoff detection portion that receives the branched optical signal and detects input shutoff;
wherein when at least one of a situation where the input shutoff is detected and a situation where the input shutoff is not detected and the wavelength band control information has an uncertain value occurs, the control portion closes the gate and notifies the abnormal state.

11. The optical wavelength multiplexing device according to claim 7, wherein the control potion detects that the wavelength band control information has an uncertain value, and makes the optical band-pass filter close a gate.

12. The optical wavelength multiplexing device according to claim 11, further comprising:
a branching portion to branch an optical multiplex signal output from the multiplexing portion; and
an input shutoff detection portion that receives the branched optical signal and detects input shutoff;
wherein when at least one of a situation where the input shutoff is detected and a situation where the input shutoff is not detected and the wavelength band control information has an uncertain value occurs, the control portion closes the gate and notifies the abnormal state.

13. An optical wavelength dividing device comprising:
an optical band-pass filter capable of changing a center wavelength and a band width;
a storage portion that stores wavelength band control information specifying the center wavelength and the band width; and
a control portion that controls the center wavelength and the band width of the optical band-pass filter based on the wavelength band control information; and
a dividing portion that receives an optical multiplex signal output from the optical band-pass filter.

14. The optical wavelength dividing device according to claim 13, wherein:
the control potion detects that the wavelength band control information has an uncertain value; and
the optical band-pass filter, when the detection is notified, closes a gate.

15. An optical wavelength dividing device comprising a plurality of optical wavelength dividing devices according to claim 13,
wherein the optical wavelength dividing device further comprises a block dividing portion that divides an optical multiplex signal into a plurality of optical multiplex signals having different wavelength bands and outputs the plurality of optical multiplex signals to the plurality of optical wavelength dividing devices.

16. The optical wavelength dividing device according to claim 15, wherein:
the control potion detects that the wavelength band control information has an uncertain value; and
the optical band-pass filter, when the detection is notified, closes a gate.

17. An optical wavelength dividing multiplexing device comprising:
an optical wavelength multiplexing device comprising:
a multiplexing portion that outputs an optical multiplex signal by multiplexing optical signals;
an optical band-pass filter that receives an optical multiplex signal output by the multiplexing portion and lets the received optical multiplex signal pass therethrough, the optical band-pass filter being capable of changing a center wavelength and a band width;
a storage portion that stores wavelength band control information specifying the center wavelength and the band width; and
a control portion that controls the center wavelength and the band width of the optical band-pass filter based on the wavelength band control information; and
an optical wavelength dividing device according to claim 13.

18. The optical wavelength dividing multiplexing device according to claim 17, further comprising a plurality of the optical wavelength multiplexing devices and the optical wavelength dividing devices, wherein the optical wavelength dividing multiplexing device further comprises:
a block multiplexing portion that multiplexing optical signals of the plurality of optical wavelength multiplexing devices; and
a block dividing portion that receives an optical multiplex signal from the block multiplexing portion, divides the optical multiplex signal, and outputs the divided optical multiplex signals to their respective ones of the plurality of optical wavelength dividing devices.

19. A method of controlling an optical band-pass filter installed in at least one of an optical wavelength multiplexing device and an optical wavelength dividing device, the method comprising:
determining wavelength band control information specifying a center wavelength and a band width of the optical band-pass filter capable of changing the center wavelength and the band width; and
controlling the center wavelength and the band width of the optical band-pass filter based on the wavelength band control information.

* * * * *